Nov. 5, 1935.         W. A. RIDDELL         2,019,731
AUTOMATIC SHUTTER ACTUATOR
Filed Feb. 27, 1935         2 Sheets—Sheet 1
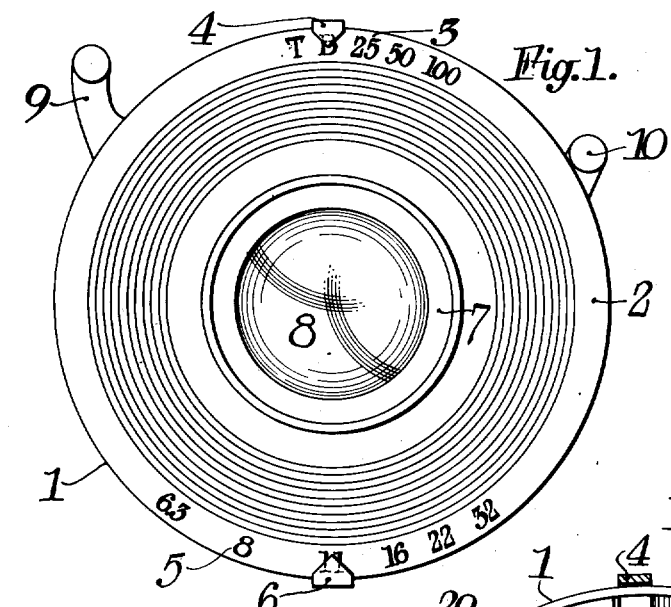
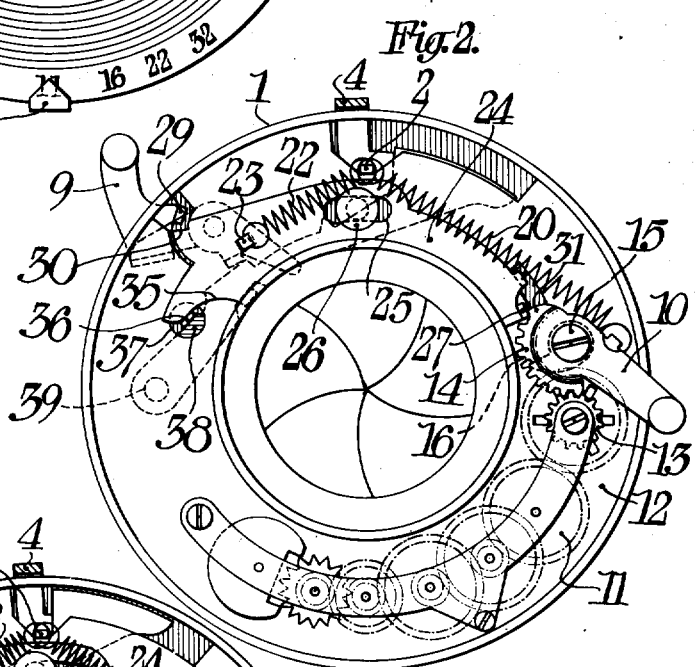
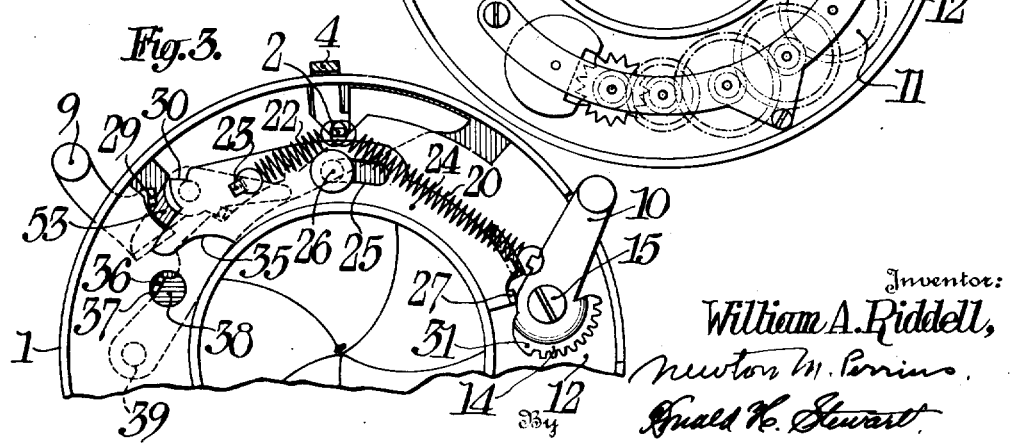
Inventor:
William A. Riddell, Nov. 5, 1935.    W. A. RIDDELL    2,019,731
AUTOMATIC SHUTTER ACTUATOR
Filed Feb. 27, 1935    2 Sheets-Sheet 2

Inventor:
William A. Riddell,
By Newton N. Perrin,
Donald H. Stewart,
Attorneys

Patented Nov. 5, 1935

2,019,731

UNITED STATES PATENT OFFICE 2,019,731

AUTOMATIC SHUTTER ACTUATOR

William A. Riddell, Rochester, N. Y., assignor to Eastman Kodak Company, Rochester, N. Y., a corporation of New York Application February 27, 1935, Serial No. 8,527

8 Claims. (Cl. 95—63)

This invention relates to photography and more particularly to shutters for photographic cameras. One object of my invention is to provide a photographic shutter with a shutter actuating mechanism so as to delay the start of an exposure. Another object of my invention is to provide a shutter actuator with means for protecting the parts of the shutter against injury, in case they should be improperly set before an exposure is made. Another object of my invention is to provide a shutter actuating mechanism with a means for preventing time or bulb exposures, so that an instantaneous exposure will always occur when the shutter actuator is used. Other objects will appear from the following specification, the novel features being particularly pointed out in the claims at the end thereof.

Coming now to the drawings wherein like reference characters denote like parts throughout:

Fig. 1 is a front elevation of a shutter which may be constructed in accordance with and embodying a preferred form of my invention.

Fig. 2 is a plan view of the shutter shown in Fig. 1, but with the shutter cover removed, showing the shutter actuating mechanism in a set position before it actuates the shutter.

Fig. 3 is a fragmentary view similar to Fig. 2, but with the shutter actuating mechanism in an inoperative position so that the shutter may be actuated in the usual way.

Figure 4:
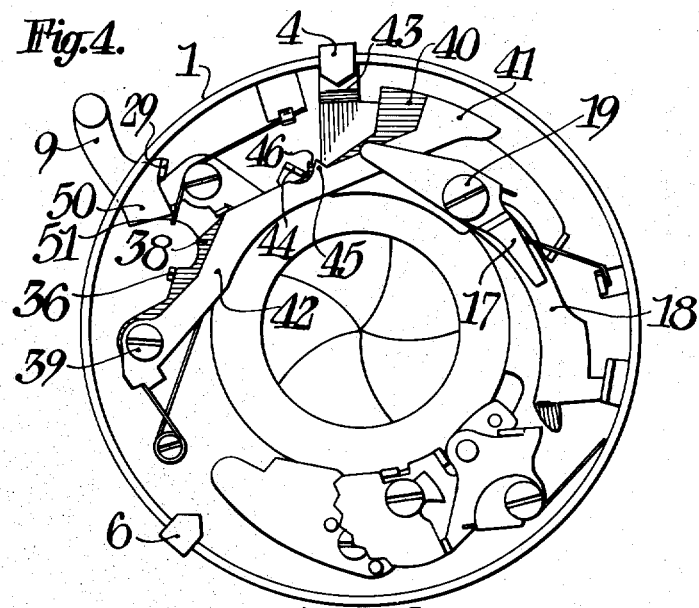
Fig. 4 is a plan view of the shutter, but with the plate carrying the shutter actuating mechanism removed to show the shutter operating parts. These parts are shown in position for a delayed exposure.

The present shutter actuating mechanism is for an improvement over the shutter actuating mechanism shown in my co-pending application Serial No. 743,999, filed September 14, 1934.

As illustrated in the drawings, a preferred form of my invention may consist of a shutter comprising a casing 1, having a shutter cover plate 2, an exposure scale 3, over which a pointer 4 may be moved for selecting the type of exposures, and a diaphragm scale 5, over which a pointer 6 may be moved to select the desired diaphragm opening.

A lens cell 7 may carry the front element 8 of an objective, and the shutter is provided with the usual exposure trigger 9. The lever 10 is a setting lever for setting the automatic shutter actuating mechanism.

As indicated in Fig. 2, and as described in my co-pending application, the automatic shutter actuating mechanism may consist of a gear train, designated broadly as 11, mounted on an annular plate 12, this gear train terminating at one end in a gear 13, meshing with a gear segment 14 carried by the lever 10, pivoted upon a stud 15 passing down through the plate 12, and terminating in a cam 16 adapted to engage and operate the shutter mechanism through contact with the flange 17 of the master member 18, pivoted at 19 to the shutter casing, as best shown in Fig. 4.

A spring 20 connects the gear segment 14 with a fixed post 21 and furnishes power for operating the timing mechanism. A spring 22 connects post 21 with a lug 23 carried by a slidably mounted latching plate 24, this latching plate including a slot 25 surrounding a pin 26, which limits the motion of this member.

At one end the latching plate 24 carries a lug 27 adapted to form a stop for the gear segment 14 when the spring 20 is under compression, as shown in Fig. 2. However, when the trigger 9 is depressed, a lug 29 will engage a hook-like flange 30 on the latching plate 24 and move it in a counter-clockwise direction against the pressure of spring 22. This will remove lug 27 from behind the latching end 31 of the gear segment 14 and permit spring 20 to rotate the shaft 5, this rotative movement, of course, being delayed by the gear train 11.

As thus far described, the mechanism is the same as that shown in my above-mentioned application.

However, the structure which will now be described is quite different from my earlier application and was provided so as to render a shutter substantially foolproof.

In the earlier form of my invention, if the shutter was set for any of the instantaneous exposures, the shutter actuating mechanism would work satisfactorily, but if the shutter should be set for a delayed exposure, such as time or bulb, it was possible, by pressing down with great force upon the lever 10, to spring or bend the shutter mechanism and thus ruin the shutter.

In order to prevent this, I have provided a means for causing the shutter to always produce an instantaneous exposure regardless of the setting of lever 4 when the lever 10 is depressed to set the automatic shutter actuating mechanism. This prevents the shutter from being damaged, and after an automatic exposure has been made, permits the exposure indicated by the scale 3 to be made by the shutter when the trigger alone is depressed.

To accomplish this result, the end of the latching plate 24 is provided with a cam 35, this cam being so positioned that it may engage an upstanding lug 36 projecting through an aperture 37 in the annular plate 12. Lug 36 is formed on a lever 38 pivoted at 39 which must be moved to produce a delayed exposure, such as a time or bulb exposure.

Referring to Fig. 4, a time or bulb exposure can be made when the lever 4 is set over "T" or "B" on the scale 3, as shown in Fig. 1. When so set, the ends 40 and 41 of the levers 38 and 42 extend beyond the flange 43 of the setting lever 4 and are free to move to and from the annular shutter casing 1. When the parts are in the position shown in Fig. 4, by depressing the trigger 9, the master member 18 is actuated.

Figure 5:
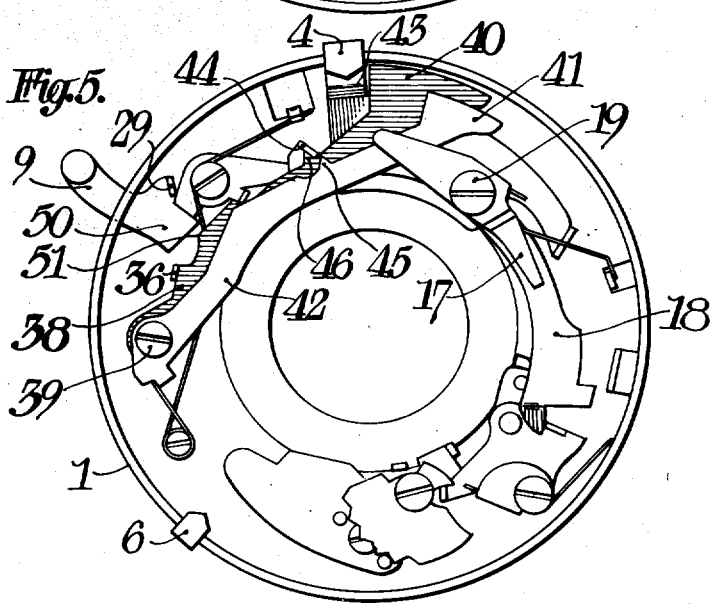
Fig. 5 is a view similar to Fig. 4 after the trigger has been pressed once, showing the time and bulb levers in an operative position, holding the shutter blades open.

This master member carries an upstanding lug 44 and when the shutter is set for time and bulb, one of the hooks 45 or 46 will engage this upstanding lug, as indicated in Fig. 5, so that an additional pressure on the shutter trigger 9 is required to complete the exposure. As indicated in Fig. 5, lever 38 has moved upon its pivot 39 until the hook 46 engages the master member lug 44, thus preventing the master member from returning to its initial position. A second depression of the trigger 9 will cause a portion 50 of the trigger 9 to contact with a shoulder 51 on lever 38 and thus move the lug 46 from its operative position in which it engages the master member lug 44.

In order to prevent the shutter from making either a time or bulb exposure when the latching plate 24 has been moved to its operative position, as shown in Fig. 2, the cam 35 is so positioned that when the latching plate is set, the lug 36 cannot move. Consequently, lever 38 is unable to move in a counter-clockwise direction about its pivot 39, and the master member will not be delayed by engagement of the hook 46 and lug 44 so that if the automatic shutter actuator spring is put under compression by moving lever 10 to the position shown in Fig. 2, an instantaneous exposure will result.

Although fully described in my previously mentioned application, it is pointed out here that when the shutter is in the position shown in Fig. 3, the lug 29 can move freely through the slot 53 without striking the end of the latching plate 24. This will produce an instantaneous, time, or bulb exposure, according to the setting of lever 4.

However, when the lever 10 has been depressed to set the actuator spring 20 when the trigger 9 is depressed, the lug 29 by pressing on the edge 30 of the latching plate will cause an automatic exposure to be made, since the contact between these two points moves the latching plate 24 the necessary distance to release gear segment 14.

With this construction there is no possibility of an operator damaging the shutter parts by applying too great pressure to the lever 10 in an attempt to set this lever when the shutter is set for either time or bulb exposures.

Moreover, after an instantaneous exposure has been made by the use of the shutter actuating mechanism, the next regular exposure of the shutter by means of the trigger 9 will be in accordance with the setting of lever 4.

The operation of my shutter is extremely simple. As is usual with the ordinary photographic shutter, for making exposures in the usual way, it is only necessary to adjust the pointer 4 to the desired part of the exposure scale and depress the trigger 9. However, if a delayed instantaneous exposure is to be made, say 1/25 or 1/50 of a second, the lever 4 can be placed at the desired point on the scale and the lever 10 tensioned. By depressing the trigger 9, the gear segment 14 is released and the spring will cause the shaft 5 to slowly turn until the cam 31 engages lever 17 of the master member 18 and actuates the shutter mechanism.

Should the operator accidentally adjust the lever 4 for a delayed exposure, such as time or bulb, and then set the lever 10 for the automatic shutter actuator, the lug 36 of the time and bulb lever 38 will be automatically held against movement by the cam 35. Thus an instantaneous exposure will be made and the shutter mechanism will not be damaged, regardless of the pressure applied to the setting lever 10.

Having thus described my invention, what I claim as new and desire to be secured by Letters Patent of the United States is:

1. In a photographic shutter for making instantaneous and retarded exposures including shutter leaves, leaf-operating mechanism, a movably mounted member adapted to control the type of exposures, the combination with a shutter actuator, of a latching plate adapted to move to an operative position for the shutter actuator to operate the shutter, said latching plate, when in an operative position being adapted to lie in the path of the movably mounted member controlling the type of exposure and thereby prevent movement of said member whereby only instantaneous exposures can be made.

2. In a photographic shutter for making instantaneous and retarded exposures including an exposure setting lever, shutter leaves, leaf-operating mechanism, a movably mounted member adapted to control the type of exposure under the control of the setting lever, the combination with a shutter actuator, of a latching plate adapted to move to an operative position for the shutter actuator to operate the shutter, said latching plate, when in an operative position being adapted to lie in the path of the movably mounted member controlling the type of exposure and thereby prevent movement of said member whereby only instantaneous exposures can be made, regardless of the setting of the exposure setting lever.

3. In a photographic shutter including shutter leaves, leaf-operating mechanism, a movably mounted member adapted to move from an inoperative position to an operative position to produce retarded exposures, and a movable trigger for controlling the leaf-operating mechanism, the combination with an automatic shutter-operating mechanism, of a latching plate movably mounted with respect to the movable member, trigger and automatic shutter-operating mechanism and adapted to hold one or the other against sufficient movement to operate the shutter leaves, said latching plate being also adapted to lie in the path of the movable member and retain it in an inoperative position when the latching plate is moved to hold the trigger against sufficient movement to operate the shutter leaves.

4. In a photographic shutter including shutter leaves, leaf-operating mechanism, a movable member for producing exposures of increased duration, and a movable trigger for controlling the leaf-operating mechanism, the combination with an automatic shutter-operating mechanism, of a latching plate movably mounted with respect to the movable member, trigger, and automatic shutter-operating mechanism and adapted to hold the trigger against sufficient movement to actuate the shutter leaves, said latching plate being also adapted to lie in the path of movement of the movable member and trigger whereby movement of the latter may move the latching plate and whereby the latching plate may prevent movement of the movable member.

5. In a photographic shutter including shutter leaves, leaf-operating mechanism, means for controlling the duration of exposures, and a movable trigger for controlling the leaf-operating mechanism, the combination with an automatic shutter-operating mechanism, of a latching plate movably mounted with respect to the movable member, trigger, and automatic shutter-operating mechanism and adapted to hold one or the other against sufficient movement to operate the shutter leaves, said latching plate being adapted to lie in the path of the movable member and trigger whereby movement of the trigger may move the latching plate and whereby the means for controlling the duration of exposures will be held in a position adapted to give an instantaneous exposure when the shutter leaves are operated.

6. In a photographic shutter including shutter leaves, a leaf-operating mechanism, a movable lever including a lug and adapted to control the duration of an exposure, and the movable trigger for controlling the leaf-operating mechanism, the combination with an automatic shutter-operating mechanism, of a latching plate movably mounted with respect to the automatic shutter-operating mechanism, a spring setting lever included in the shutter-operating mechanism adapted to be moved to tension the spring, a latch element included in the shutter-operating mechanism to hold the shutter-operating mechanism against movement, and a latching plate adapted to engage said latch element and the means for controlling the duration of the exposure whereby only an instantaneous exposure can be obtained with the shutter mechanism when the automatic shutter-operating mechanism is in position to function.

7. In a photographic shutter including shutter leaves, a leaf-operating mechanism, a movable lever for controlling the duration of an exposure, having a lug formed thereon and a movable trigger for controlling the leaf-operating mechanism, the combination with an automatic shutter-operating mechanism, a latching plate movably mounted with respect to the automatic operating mechanism and the camera trigger, a cam on the latching plate adapted to engage the lug on the lever for controlling the duration of exposure, said cam and lug being so positioned that when said latching plate lies in an operative position in which it may lie in the path of the shutter trigger, the shutter mechanism is automatically controlled for an instantaneous exposure.

8. In a photographic shutter adapted to produce instantaneous time and bulb exposures and including shutter leaves, leaf-operating mechanism, a movable lever for controlling the leaf-operating mechanism, the combination with an automatic shutter-operating mechanism, of a latching plate movably mounted with respect to the automatic shutter-operating mechanism, the trigger and the lever for producing time and bulb exposures, and means carried by the latching plate for engaging the time and bulb lever whereby said shutter means produced an instantaneous exposure during the time the latching plate lies in the path of the shutter trigger to render the automatic shutter-operating mechanism operative.

WILLIAM A. RIDDELL.